(12) United States Patent  
Mudalige

(10) Patent No.: US 8,466,807 B2
(45) Date of Patent: Jun. 18, 2013

(54) FAST COLLISION DETECTION TECHNIQUE FOR CONNECTED AUTONOMOUS AND MANUAL VEHICLES

(75) Inventor: Upali Priyantha Mudalige, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 226 days.

(21) Appl. No.: 13/150,465

(22) Filed: Jun. 1, 2011

(65) Prior Publication Data

US 2012/0306663 A1   Dec. 6, 2012

(51) Int. Cl.
*G08G 1/16* (2006.01)

(52) U.S. Cl.
USPC ........... 340/903; 340/435; 340/901; 340/935; 340/438; 701/1; 701/70; 701/301; 701/300

(58) Field of Classification Search
USPC ... 340/903, 435, 901, 932.2, 935, 438; 701/1, 701/70, 301, 300; 455/456.3
See application file for complete search history.

(56) References Cited

U.S. PATENT DOCUMENTS

| | | | |
|---|---|---|---|
| 7,580,035 B2 | 8/2009 | Sathe et al. | |
| 7,737,997 B2 * | 6/2010 | Sathe et al. | 345/619 |
| 2007/0063874 A1 * | 3/2007 | Danz et al. | 340/932.2 |
| 2008/0303696 A1 * | 12/2008 | Aso et al. | 340/935 |
| 2009/0138201 A1 * | 5/2009 | Eckstein et al. | 701/301 |
| 2009/0143987 A1 * | 6/2009 | Bect et al. | 701/301 |
| 2009/0192710 A1 * | 7/2009 | Eidehall et al. | 701/301 |
| 2010/0063735 A1 * | 3/2010 | Kindo et al. | 701/300 |
| 2011/0190972 A1 * | 8/2011 | Timmons et al. | 701/29 |
| 2011/0210866 A1 * | 9/2011 | David et al. | 340/903 |
| 2011/0231095 A1 * | 9/2011 | Nakada et al. | 701/301 |
| 2011/0234390 A1 * | 9/2011 | Danner et al. | 340/438 |
| 2011/0246071 A1 * | 10/2011 | Tsunekawa | 701/301 |
| 2012/0262284 A1 * | 10/2012 | Irrgang et al. | 340/435 |
| 2012/0306663 A1 * | 12/2012 | Mudalige | 340/903 |

* cited by examiner

*Primary Examiner* — Hoi Lau

(57) ABSTRACT

A method is provided for rapidly identifying potential collision threats between communicating vehicles in a vehicle communication network for actuating a vehicle control action to mitigate potential collisions between the communicating vehicles. Vehicle boundaries and trajectory path boundaries are constructed for the communicating vehicles for efficiently identifying a potential collision. Prioritized assessments are performed to determine which respective boundaries intersect one another. Based on whether respective boundaries that intersect one another will determine if a control vehicle control action is initiated and which control action is imitated. Once the intersecting boundaries are identified, a location of the potential collision can be rapidly identified by a technique that subdivides and regenerates the intersecting trajectory path boundaries of the vehicles. A distance to the potential collision may be determined that is used to further enhance the control action taken for mitigating the potential collision.

20 Claims, 6 Drawing Sheets

FAST COLLISION DETECTION TECHNIQUE FOR CONNECTED AUTONOMOUS AND MANUAL VEHICLES

BACKGROUND OF INVENTION

An embodiment relates generally to V2V communications and collision avoidance systems.

Real time collision prediction algorithms predict potential collisions between two or more vehicles. Collision prediction algorithms typically utilize a central processor for determining whether a collision is imminent. However, many collision predictions algorithms are computational intensive, and therefore, time consuming. Due to the computational intensiveness required to meet the real time performance, some collision prediction systems compromise accuracy to speed-up the processing time. As a result, such collision predictions systems increase the false detection rates, which may become a nuisance to the user of the vehicle. This is also a potential safety risk for autonomous vehicle operations and their functional performance.

SUMMARY OF INVENTION

An advantage of an embodiment is a rapid assessment of a potential collision between a first vehicle and a second vehicle having V2V communication capabilities. Boundaries are constructed around each vehicle and around a trajectory path of travel for each vehicle. The respective boundaries are assessed for determining whether an intersection is present between the boundaries. Based on the prioritized assessments of which boundaries are intersecting, respective control actions are actuated for mitigating a potential collision.

In addition, based on which boundaries are intersecting, a location of the intersection of the collision is rapidly and efficiently determined by constructing boundary boxes about the trajectory path of travel. The boundary boxes are repeatedly subdivided and regenerated for rapidly and accurately identifying the intersection of the potential collision.

An embodiment contemplates a method of rapidly identifying potential collision threats between communicating vehicles of a vehicle communication network for actuating a vehicle control action to mitigate potential collisions between the communicating vehicles. The method includes determining a vehicle position and trajectory path of a host vehicle. A trajectory path boundary around the trajectory path and a vehicle boundary around the vehicle position is constructed. A vehicle position and trajectory path of a remote vehicle is received via the wireless communication network. A trajectory path boundary is identified around the trajectory path of the remote vehicle and a vehicle boundary is identified around the vehicle position of the remote vehicle. Assessing in a first priority test whether an intersection is present between the vehicle boundary of the host vehicle and the vehicle boundary of the remote vehicle. A first control action is actuated in the host vehicle for mitigating a collision threat only if the intersection is present between the vehicle boundary of the host vehicle and the vehicle boundary of the remote vehicle. If an intersection is not present in the first priority test, then assessing in a second priority test whether an intersection is present between the trajectory path boundary of one of the host or remote vehicle and vehicle boundary of the other of the host vehicle or remote vehicle. Actuating a second control action in the host vehicle for mitigating a collision threat only if the intersection is present between a respective vehicle boundary and a respective trajectory path boundary. If an intersection is not present in the second priority test, then assessing in a third priority test whether an intersection is present between the trajectory path boundary of the host vehicle and the trajectory path boundary of the remote vehicle. Actuating a third control action in at least one of the host vehicle or remote vehicle for mitigating a collision threat only if the intersection is present between the trajectory path boundary of the host vehicle and the trajectory path boundary of the remote vehicle.

An embodiment contemplates a collision assessment and mitigation system that includes a vehicle-to-vehicle communication module for transmitting and receiving messages between a host vehicle and a remote vehicle. The messages received from the remote vehicle include a vehicle position of the remote vehicle and a trajectory path of travel of the remote vehicle. A threat assessment module assesses a potential collision between the host vehicle and the remote vehicle. The threat assessment module identifies a vehicle position and a trajectory path of the host vehicle. The threat assessment module constructs a vehicle boundary around the vehicle position of the host vehicle and a trajectory path boundary around the trajectory path of the host vehicle. The threat assessment module constructs a vehicle boundary around the vehicle position of the remote vehicle and a trajectory path boundary around the trajectory path of the remote vehicle. The vehicle threat assessment module assesses a potential collision based on intersections of the respective boundaries between the host vehicle and the remote vehicle. A vehicle control module actuates a control action for mitigating the potential collision based on the assessment by the threat assessment module. The threat assessment module is configured to perform the method comprising the steps of assessing in a first priority test whether an intersection between the vehicle boundary of the host vehicle and the vehicle boundary of the remote vehicle is present. A first control action is actuated in the host vehicle only if the intersection is present between the vehicle boundary of the host vehicle and the vehicle boundary of the remote vehicle. If an intersection is not present in the first priority test, then assessing in a second priority test whether an intersection between the respective trajectory path boundary of one of the host or remote vehicle and a respective vehicle boundary of the other of the host vehicle or remote vehicle is present. A second control action is actuated to the host vehicle only if the intersection is present between a respective vehicle boundary and a respective trajectory path boundary is present. If an intersection is not present in the second priority test, then assessing in a third priority test whether an intersection between the trajectory path boundary of the host vehicle and the trajectory path boundary of the remote vehicle is present. A third control action is applied to the host vehicle only if the intersection is present between the trajectory path boundary of the host vehicle and the trajectory path boundary of the remote vehicle.

DETAILED DESCRIPTION

Figure 1:
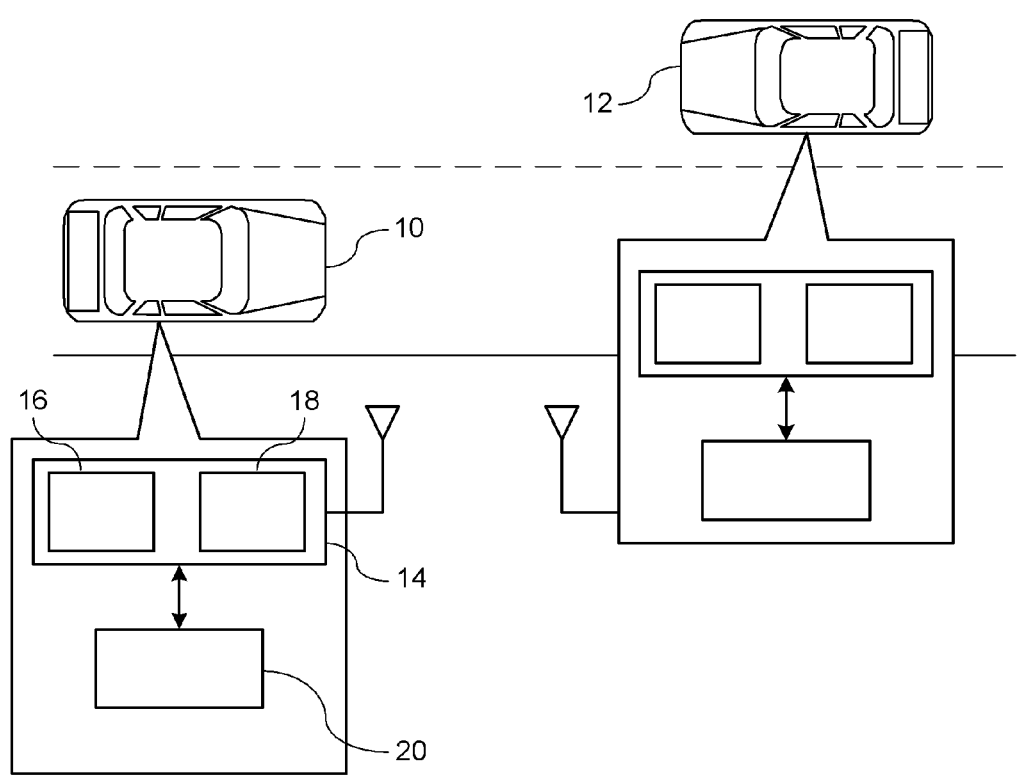
FIG. 1 is a traffic flow diagram of vehicles in a V2V communication network.

There is shown generally in FIG. 1 a traffic flow diagram illustrating a first vehicle 10 and a second vehicle 12. The remote vehicle 12 has communication capabilities with the first vehicle 10 known as vehicle-to-vehicle (V2V) communications. The first vehicle 10 and the second vehicle 12 broadcast wireless messages to one another over a respective inter-vehicle communication network (e.g., DSRC) for exchanging data. Data may include vehicle position data as well as information for determining a trajectory path of the vehicle. The trajectory path data may be based on a map route that that is input into a vehicle-based GPS device or other similar device. Moreover, the trajectory path may be based on information from vehicles forward of a driven vehicle where the leading vehicles communicate their trajectory and/or vehicle position data to a trailing vehicle so that trajectory path may be constructed by the trailing vehicle.

Each of the communicating vehicles 10 and 12 includes a vehicle communication module 14 having a transmitter 16 for transmitting messages and a receiver 18 for receiving messages within the vehicle communication network.

The communicating vehicles 10 and 12 may further include a threat assessment module 20. The threat assessment module 20 may be a stand alone module such as safety restraint module or collision assessment module, or may be integrated as part of another module that shares a microprocessor. The threat assessment module 20 of the first vehicle 10 assesses a potential collision with the second vehicle 12 by assessing the current vehicle position and trajectory path of travel of both vehicles.

Figure 2:
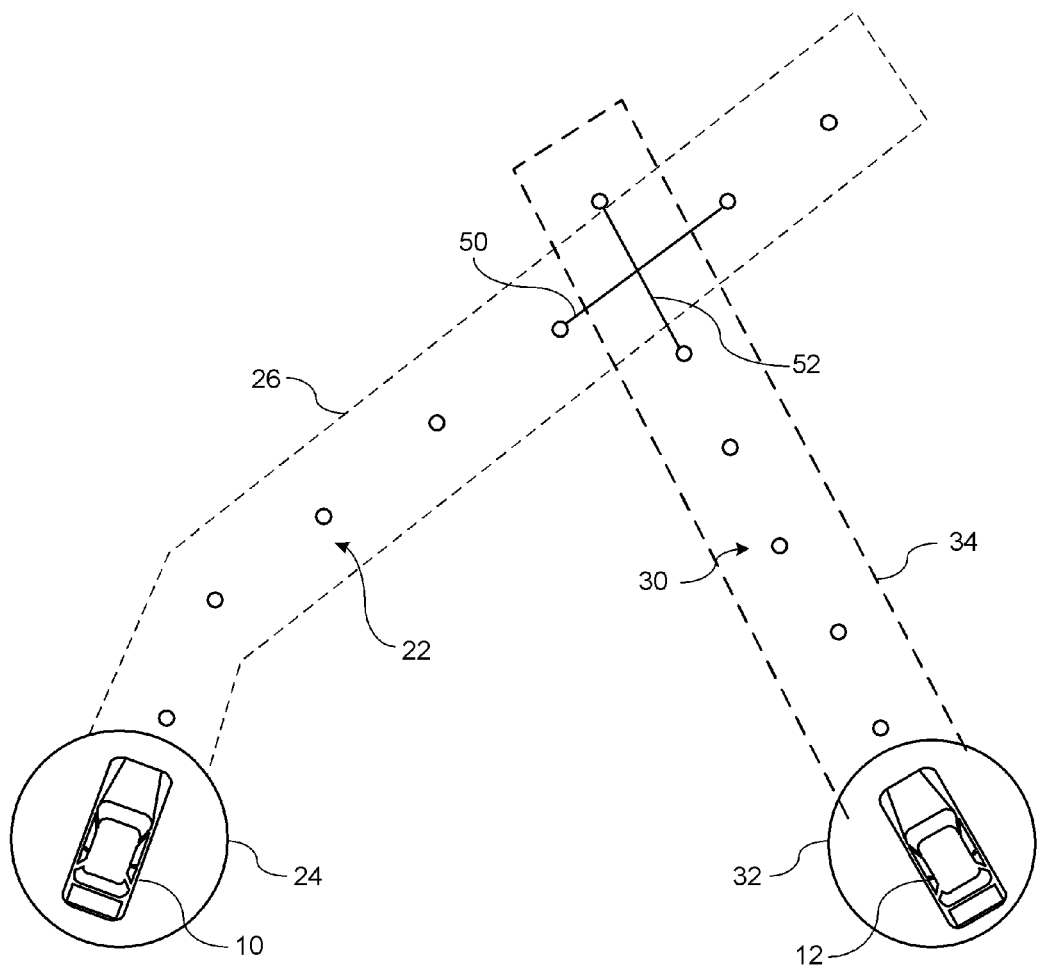
FIG. 2 is a schematic representation of the constructed boundaries for assessing collision threats.

FIG. 2 illustrates a schematic representation of the boundaries constructed by the threat assessment module 20 for determining a potential collision threat with the second vehicle 12. The first vehicle 10 is shown traveling along a trajectory path 22. The trajectory path 22 is a plurality of trajectory index positions that correspond to GPS waypoint locations. A vehicle boundary 24 is constructed around the first vehicle 10. The vehicle boundary 24 is constructed using a position of the vehicle, the dimensions of the vehicle, and an additional safety margin. The vehicle boundary 24 may form a circle, ellipse, rectangle, square, or other polygon around the perimeter of the vehicle. The safety margin is not required to be uniform around the vehicle and may vary at different locations of the vehicle. For example, the boundary may have a larger margin in the front of the vehicle in contrast to the rear of the vehicle. Other factors that may be considered when constructing a boundary around the vehicle may include, but are not limited to, GPS accuracy and vehicle speed.

A trajectory path boundary 26 is constructed around the trajectory path 22 of the first vehicle 10. The trajectory path 26 is a plurality of trajectory index positions that correspond to GPS waypoint locations. The trajectory path boundary 26 forms an envelope around the projected path of travel of the first vehicle 10. The trajectory path boundary 26 is typically in the shape of a polygon that is representative of the path of travel and the lane width. The length of the trajectory path boundary 26 is based on a speed of the first vehicle 10 and a predicted clear path of travel ahead of the vehicle. The width of the trajectory path boundary 26 depends on either the vehicle width or width of the vehicle lane. Both the length and the width may include an addition safety margin.

The second vehicle 12 is shown traveling along a trajectory path 30. A vehicle boundary 32 is constructed around the second vehicle 12 and a trajectory path boundary 34 is constructed around the trajectory path 30 of the second vehicle 12. The vehicle boundary 32 and the trajectory path boundary 34 are constructed in a similar manner as described above. The first vehicle 10 receives data from the second vehicle 12, and the vehicle boundary 32 and the trajectory path boundary 34 of the second vehicle 12 are constructed based on the received data.

Once the respective vehicle boundaries and respective trajectory path boundaries are constructed, the host vehicle 10 assesses a potential collision threat. It is understood that the term host vehicle as used herein is the vehicle that receives data from a remote vehicle and assesses a potential collision with the remote vehicle. As a result, each vehicle is considered a host vehicle when it is assessing its own safety with respect to vehicles remote from itself.

Figure 3:
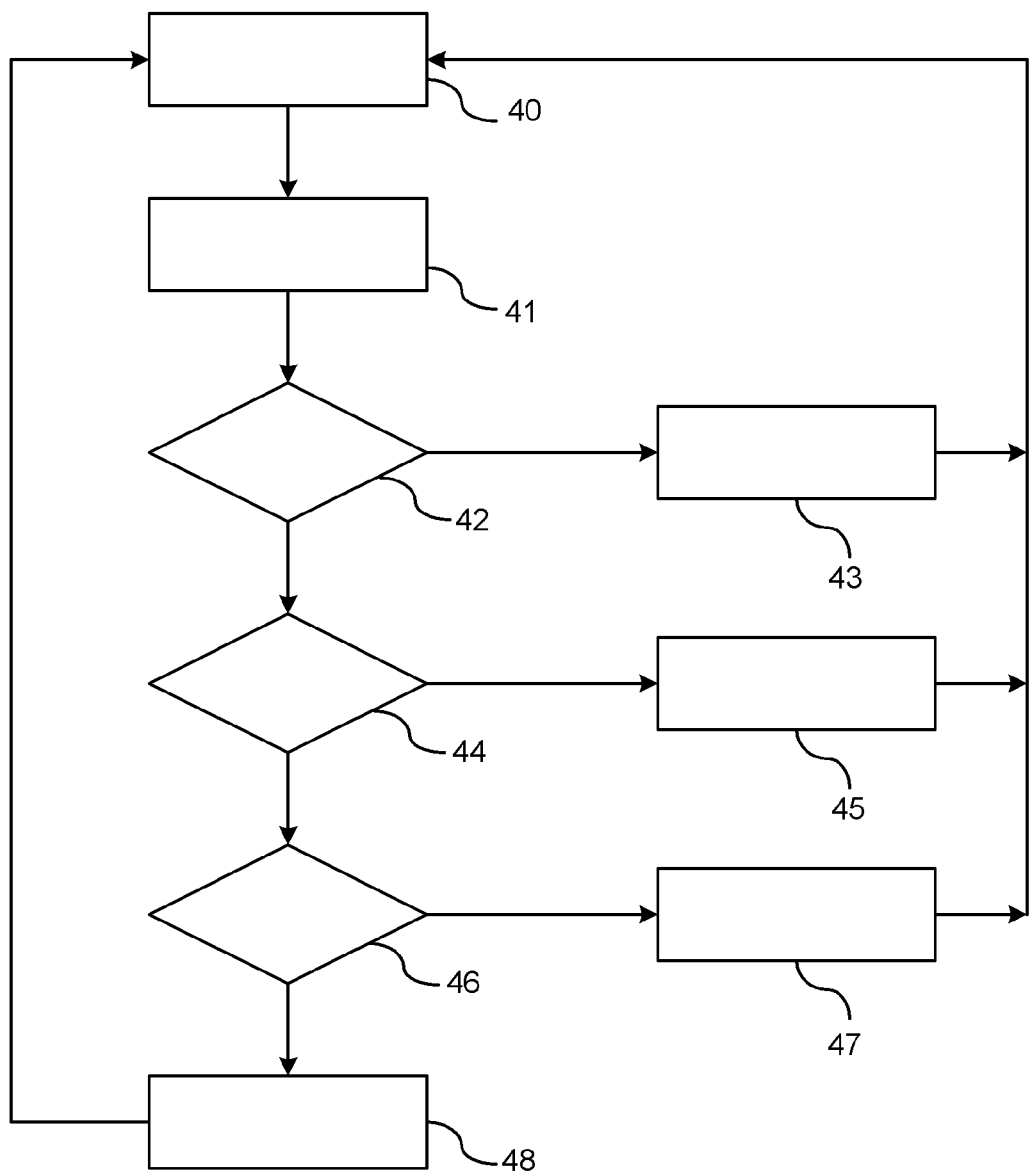
FIG. 3 is a flowchart of a method for performing a rapid assessment for a potential collision.

FIG. 3 illustrates a flow diagram for performing a rapid assessment for a potential collision. The advantage described herein is that the host vehicle follows a hierarchical decision flow sequence for assessing whether a collision may occur with another vehicle. The efficiency in rapidly assessing the potential collision with a remote vehicle is to first evaluate those scenarios that are imminent of a potential collision which typically have the least amount of computational demand. Such scenarios when identified require immediate action as their collision is imminent. Those situations that are not imminent require greater computational demand since the location of the collision must be determined. In addition, the technique described herein rapidly assesses and identifies the location along the trajectory path of where the collision will occur. The boundary box regeneration technique is described in detail later in FIGS. 4-7.

In step 40, the threat assessment routine is initiated. In step 41 the vehicle boundary and the trajectory path boundary are constructed for the host vehicle, and the vehicle boundary and the trajectory path boundary are constructed for the remote vehicle.

In step 42, a first priority test is initiated where a determination is made whether the vehicle boundary around the host vehicle intersects with the vehicle boundary around the remote vehicle. If the vehicle boundary of the host vehicle and the vehicle boundary of the remote vehicle intersect one another, then a determination can be readily made that the vehicles are within a respective distance of one another that a collision is imminent. Due to the imminent collision, additional analysis as to the collision is not required and a control action is immediately actuated. Therefore, if the vehicle boundaries intersect one another, the routine proceeds to step 43. If the determination is made that the vehicle boundary of the host vehicle and the vehicle boundary of the remote vehicle are not intersecting in the first priority test, then the routine advances to step 44.

In step 43, a control action is actuated to mitigate a potential collision. Since the vehicles are within a close distance relative to one another such that a potential collision is imminent, a counteraction would include applying braking to the vehicle. Based the driving mode (i.e., manual control operations mode or automatic control operations mode), a notification to the driver to apply braking or autonomous braking will be applied. A notification to the driver of the vehicle would be an indicator (e.g., visual or audible) to apply vehicle braking if the vehicle is driven under a manual control operation mode. A manual control operation mode is where the driver is required to manually apply the vehicle brakes. Autonomous braking involves a braking system of the vehicle automatically applying vehicle braking without the driver applying a braking force to the brake pedal of the vehicle, or can include the vehicle braking system applying increased braking to the vehicle in addition to that which is already being applied by the driver of the vehicle. After the control action is implemented, the routine returns to step 40 to monitor a next vehicle.

In step 44, a second priority test is initiated where a determination is made as to whether the vehicle boundary or trajectory path boundary of the host vehicle intersects with the other of the vehicle boundary or trajectory path boundary of the remote vehicle. That is, a determination will be made whether the vehicle boundary of the host vehicle intersects with the trajectory path boundary of the remote vehicle, or whether the trajectory path boundary of the host vehicle intersects the vehicle boundary of the remote vehicle. An intersection between a respective vehicle boundary and a respective trajectory path boundary indicates the likelihood of a potential collision. If the determination is made that the intersection is present in the second priority test, then the routine proceeds to step 45 for initiating a control action; otherwise, the routine proceeds to step 46.

In step 45, a control action is actuated to mitigate a potential collision. In contrast to the condition described in step 42, more time is available to take a corrective action other than braking due to the spatial distance between the vehicles. Therefore, a determination is made to identify the location where the respective collision will occur. A subroutine for rapidly identifying the location of the potential collision along the traveled route is described with respect to FIGS. 4-9. Based on the determined location of the potential collision, a control action that relates to a non-braking event may be executed. Such a control action may relate to changing the speed of the vehicle (e.g., decreasing the vehicle speed) and/or performing a steering intervention (e.g., steering maneuver to avoid the location of the potential collision). Based the driving mode of the vehicle such as manual driving mode, the control action may include a warning indicator that provides to the driver a recommended course of action to take (e.g., recommendation to reduce speed and steer around the point of collision). The control action may be an autonomous control action that would automatically decrease the vehicle speed and provide steering intervention to avoid the location of the potential collision. The control action may also include a combined manual control action and automated control action such as recommending that the driver perform a steering maneuver (e.g., steer to avoid collision location) while the speed of the vehicle is automatically reduced. After the control action is implemented, the routine returns to step 40 to monitor a next vehicle.

In step 46, a third priority test is initiated where a determination is made as to whether the trajectory path boundary of the host vehicle intersects with the trajectory path boundary of the remote vehicle. An intersection between a trajectory path boundary of the host vehicle and a trajectory path boundary of the remote vehicle indicates the likelihood of a potential collision. If the determination is made that the intersection is present between the trajectory path boundaries, then the routine proceeds to step 47 for initiating a control action.

In step 47, a control action is actuated to mitigate a potential collision. In contrast to the condition described in step 45, more time is available to take a corrective action. Therefore, a determination is made to identify the location of the collision. The subroutine as described in FIGS. 4-7 is used to rapidly identify a location of the point of collision along the traveled route. Based on the location and the distance to the collision, an appropriate control action is actuated for mitigating the potential collision. The control action may include a negotiation between vehicles that may include one vehicle slowing down or performing a steering maneuver. The negotiation may be initiating a single control action by one vehicle to avoid the potential collision. Alternatively, the control action may include a dual action on the part of both the host vehicle and the remote vehicle. The dual action may be performed simultaneously or sequentially if time permits. In addition, the collision avoidance maneuver may be performed manually by the driver, or autonomously by the vehicle, or a combination of both. After the control action is implemented, the routine returns to step 40 to monitor a next vehicle.

In step 46, if the determination is made that the trajectory path boundary of the host vehicle and the trajectory path boundary of the remote vehicle are not intersecting, then the routine advances to step 48. In step 48, a determination is made that no collision risks are determined so no control actions are implemented. The returns to step 40 monitor a next vehicle.

Figure 4:
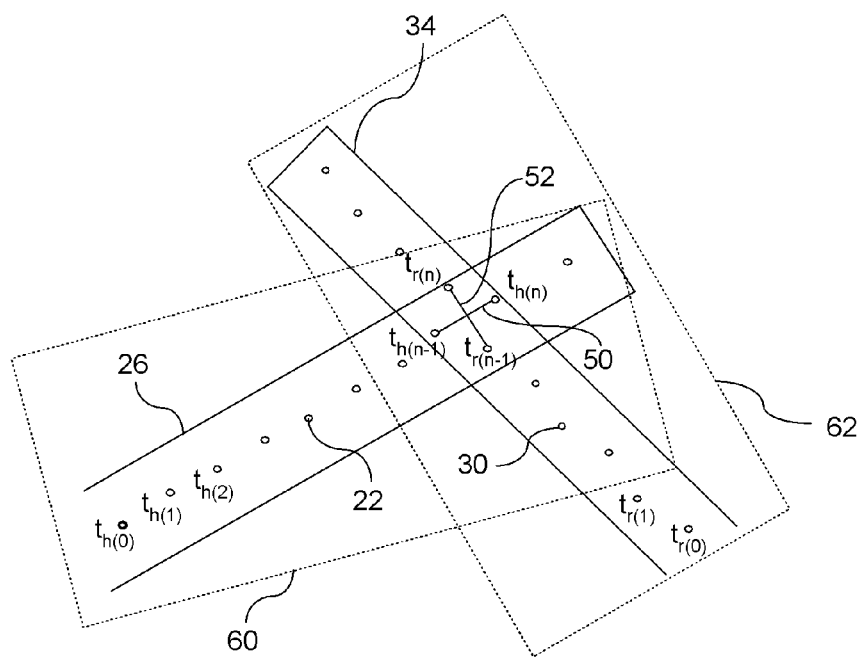
FIG. 4 is a schematic representation of a first set of constructed boundary boxes for collision assessment.

FIGS. 4-9 illustrate exemplary steps for rapidly identifying the location of the potential collision. FIG. 4 illustrates the trajectory path 22 of the host vehicle and the trajectory path 30 of the remote vehicle. The trajectory path 22 of the host vehicle is viewed as a plurality of line segments with each line segment constructed between positions of time. For example, a first line segment is represented by a line constructed between $t_{h(0)}$ and $t_{h(1)}$, a second line segment is represented by a line constructed between $t_{h(1)}$ and $t_{h(2)}$, and so forth. The trajectory path of the remote vehicle is also viewed as line segments constructed between time positions. For example, a first line segment is represented by a line constructed between $t_{r(0)}$ and $t_{r(1)}$, a second line segment is represented by a line constructed between $t_{r(1)}$ and $t_{r(2)}$, and so forth. The location of the potential intersection of the trajectory path of the host vehicle and the trajectory path of the remote vehicle is at a location where the line segment of the host vehicle represented by $t_{h(n-1)}$ and $t_{h(n)}$, hereinafter referred to as line segment 50, intersects with line segment of the remote vehicle represented by $t_{r(n-1)}$ and $t_{r(n)}$ $t_{h(n)}$, hereinafter referred to as line segment 52. A determination of where the intersection is located can be computationally extensive if all line segments of the host vehicle and the line segments of the remote vehicle required intersecting analysis. That is, a comprehensive analysis would require that the first line segment of the trajectory path of the host vehicle and the first line segment of the trajectory path of the remote vehicle are analyzed to determine if an intersection is present. If no intersection exists, then the first line segment of the trajectory path of the host vehicle is sequentially checked for an intersection with all the remaining line segments of the trajectory path of the remote vehicle. If no intersection is detected, then a second line segment of the trajectory path would be sequentially analyzed for an intersection with all the line segments of the trajectory path of the remote vehicle. Each remaining line segment of the trajectory path of the host vehicle would be sequentially analyzed with the each line segment of the trajectory path of the remote vehicle until an intersection is detected. Depending on the number of line segments, such an assessment could be time consuming and computationally extensive.

The advantage of the embodiments described herein provides for a rapid assessment for determining the intersection of the two trajectory paths. As illustrated in FIG. 4, a boundary box 60 is constructed around the trajectory path boundary 26, and a boundary box 62 is constructed around the trajectory path boundary 34. Boundary boxes 60 and 62, in the shape of rectangles, form envelopes around the entire trajectory path boundary of each vehicle.

Figure 5:
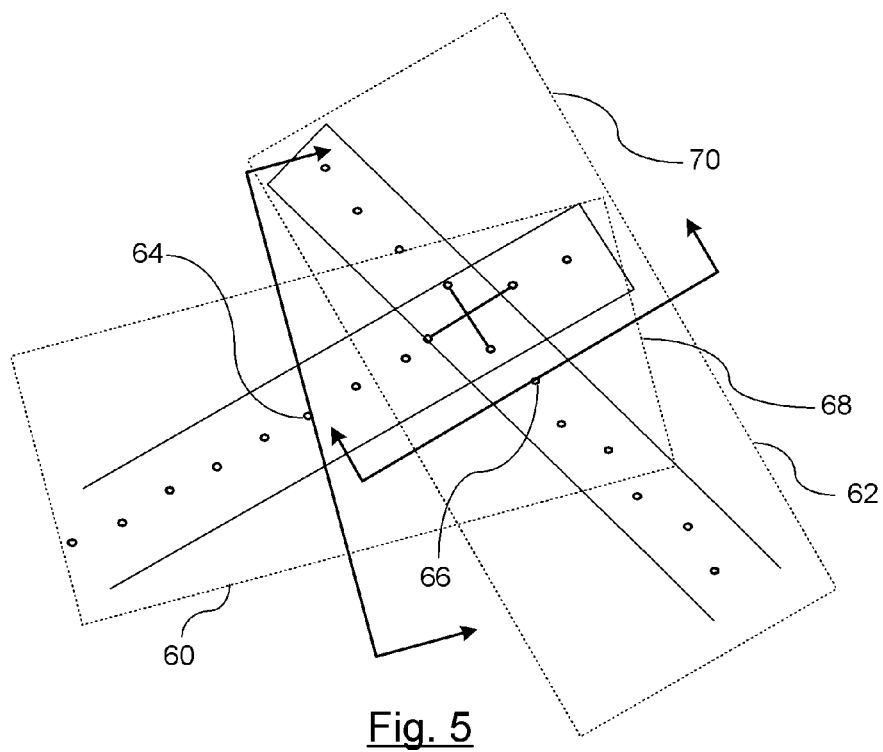
FIG. 5 is a schematic representation of subdivided boundary boxes.

In FIG. 5, midway position index locations of each boundary box 60 and 62 are identified as represented by position indexes 64 and 66, respectively. It should be understood that the midway of the index locations that contain the boundary box is used to divide the boundary box into portions, which may not be the midway point of the boundary box itself. Therefore, the subdivided boundary boxes may not be equal halves. Position indexes containing the boundary box 60 and 62 are each subdivided into two portions at the position indexes 64 and 66. The subdivided boundary boxes of each respective trajectory path that contain the intersecting line segments 50 and 52 are selected as represented by 68 and 70.

Figure 6:
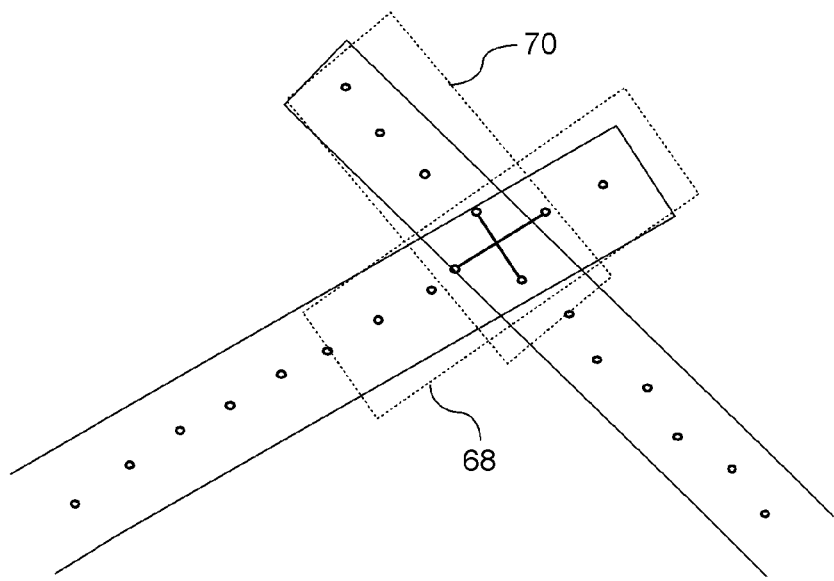
FIG. 6 is a schematic representation of regenerated boundary boxes.

In FIG. 6, subdivided boundary boxes 68 and 70 are regenerated. The boundary boxes may be regenerated by either the length and/or width based on the trajectory path of each vehicle. The regenerated boxes are not required to align to a same axis the previous boundary boxes were positioned. Rather, the routine allows each boundary box to be configured to the targeted portion of the trajectory path that the routine is analyzing. As a result, the boundary box can be repositioned to accommodate to varying change of directions along the trajectory path. For each regeneration, the boundary boxes are configured adapt to the trajectory paths at the location of the collision.

Figure 7:
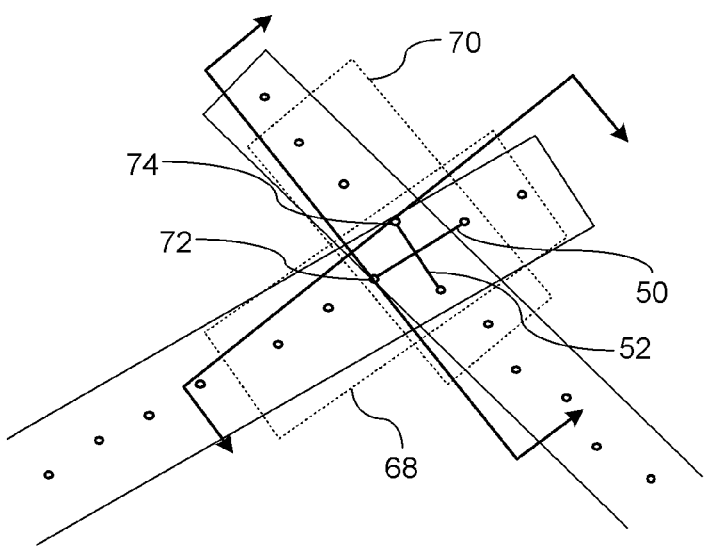
FIG. 7 is a schematic representation of subdivided regenerated boundary boxes.

In FIG. 7, the midway position index locations of each regenerated boundary box 68 and 70 are identified. Boundary boxes 68 and 70 are further subdivided into portions using the position indexes 72 and 74. The intersection of the subdivided portions is determined and a next set of intersecting boundary boxes are regenerated. The next set of regenerated boundary boxes includes the intersection of the trajectory paths. The routine repeatedly subdivides and regenerates the boundary boxes until only the respective intersecting line segments 50 and 52 are contained within the final boundary boxes. It should be understood that the subdividing of the boundary boxes may require more or less subdividing than what is shown. The subdividing of the boundary box ends when a respective remaining boundary box contains only two of the position index locations. The two positions will form line segment.

Figure 8:
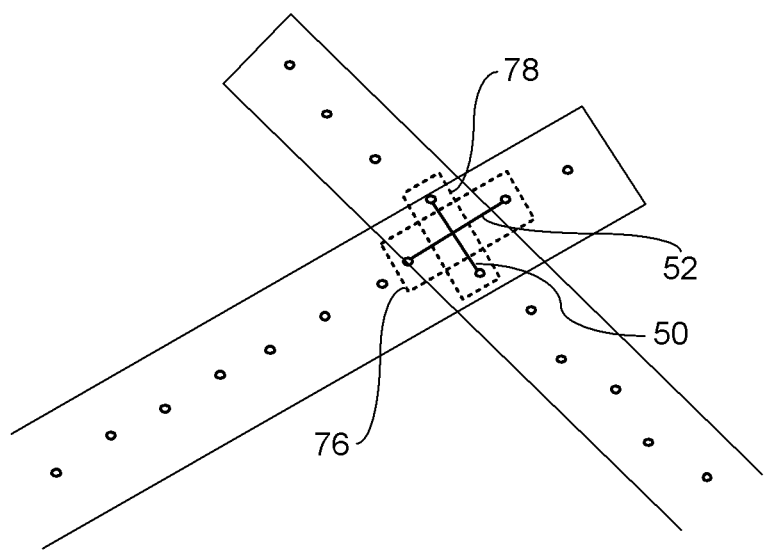
FIG. 8 is a schematic representation of the intersecting line segments representing a collision location.

FIG. 8 illustrates a final set of regenerated boundary boxes 76 and 78 where the line segments 50 and 52 intersect within their respective margins. As is shown, the only line segments that are disposed within each respective boundary box are their respective line segments. It should be understood that the technique described can used a set of index positions for identifying the intersection as opposed to the line segments. For example, it is determined that the intersection occurs between $t_{h(n-1)}$ and $t_{h(n)}$ for the host vehicle, and that the respective boundary box for the host vehicle could be subdivided and regenerated based on the boundary box containing the set of point indexes $t_{h(n-1)}$ and $t_{h(n)}$ in contrast to a line segment.

By determining the location of the potential collision, the distance and the time to the location of the collision may be determined. This allows the vehicle to assess the collision and either provide a recommendation to the driver or autonomously implement counteractions for mitigating the collision between the two vehicles.

As a result of the rapid assessment for determining whether a potential collision may be present, the computing time for assessing a collision with multiple vehicles may be performed every 50-100 ms. Therefore, a plurality of remote vehicles communicating with a host vehicle may each be evaluated by a host vehicle for assessing a potential collision with each remote vehicle. The advantage is that a general assessment is first determined as to whether a potential collision is present utilizing the intersecting boundaries. Based on whether an intersection between the boundaries are present, the routine allows for a rapid assessment of where the potential collision of the two vehicles may occur by subdividing the boundary boxes which negates having to evaluate each line segment of a trajectory path of the host vehicle with each line segment of a trajectory path of the remote vehicle which is computationally intensive and time consuming.

It should be understood that if an intersection is present between a vehicle boundary of a first vehicle and a trajectory path boundary of a second vehicle, the routine described in FIGS. 4-9 needs only to be applied to the to the trajectory path boundary of the second vehicle, the vehicle boundary of the first vehicle will only have a single line segment. Therefore, the routine only requires that the only trajectory path boundary of the second vehicle requires subdividing and regeneration to determine at what point the trajectory path will intersect the line segment representing the vehicle boundary of the first vehicle.

While certain embodiments of the present invention have been described in detail, those familiar with the art to which this invention relates will recognize various alternative designs and embodiments for practicing the invention as defined by the following claims.

What is claimed is:

1. A method of rapidly identifying potential collision threats between communicating vehicles of a vehicle communication network for actuating a vehicle control action to mitigate potential collisions between the communicating vehicles, the method comprising the steps of:
 determining a vehicle position and trajectory path of a host vehicle;
 constructing a trajectory path boundary around the trajectory path and a vehicle boundary around the vehicle position;
 receiving a vehicle position and trajectory path of a remote vehicle via the wireless communication network;
 identifying a trajectory path boundary around the trajectory path of the remote vehicle and a vehicle boundary around the vehicle position of the remote vehicle;
 assessing in a first priority test whether an intersection is present between the vehicle boundary of the host vehicle and the vehicle boundary of the remote vehicle, and actuating a first control action in the host vehicle for mitigating a collision threat only if the intersection is present between the vehicle boundary of the host vehicle and the vehicle boundary of the remote vehicle;
 if an intersection is not present in the first priority test, then assessing in a second priority test whether an intersection is present between the trajectory path boundary of one of the host or remote vehicle and vehicle boundary of the other of the host vehicle or remote vehicle, and actuating a second control action in the host vehicle for mitigating a collision threat only if the intersection is present between a respective vehicle boundary and a respective trajectory path boundary;
 if an intersection is not present in the second priority test, then assessing in a third priority test whether an intersection is present between the trajectory path boundary of the host vehicle and the trajectory path boundary of the remote vehicle, and actuating a third control action in at least one of the host vehicle or remote vehicle for mitigating a collision threat only if the intersection is present between the trajectory path boundary of the host vehicle and the trajectory path boundary of the remote vehicle.

2. The method of claim 1 wherein a determining a presence of an intersection between the trajectory path boundary of the host vehicle and the trajectory path boundary of the remote vehicle in the third priority test further comprises the steps of determining a location of the potential collision within the intersecting trajectory path boundaries between the host vehicle and the remote vehicle.

3. The method of claim 2 wherein determining the location of the potential collision between the host vehicle and the remote vehicle further comprises the steps of:
   identifying discrete trajectory positions along the trajectory path of the host vehicle;
   constructing line segments between the discrete time positions in the trajectory path of the host vehicle;
   identifying discrete time positions along the trajectory path of the remote vehicle;
   constructing line segments between the discrete time positions in the trajectory path of the remote vehicle;
   constructing a boundary box around the trajectory path boundary of the host vehicle;
   constructing a boundary box around the trajectory path boundary of the remote vehicle;
   subdividing the boundary box of the host vehicle and the boundary box of the remote vehicle;
   regenerating only the boundary boxes of the host vehicle and the remote vehicle that contain a respective intersecting line segment;
   determining if the regenerated boundary box of the host vehicle and the regenerated boundary box of the remote vehicle each contain a plurality of line segments;
   if each of the regenerated boundary boxes of the host vehicle and the remote vehicle contain a plurality of intersecting line segments, then repetitively subdividing and regenerating boundary boxes containing the plurality of line segments until the regenerated boundary boxes contain only the intersecting line segments; and
   identifying the location of the intersecting line segments between the host vehicle and the remote vehicle.

4. The method of claim 3 wherein a distance to the intersection of the line segments is determined for the host vehicle.

5. The method of claim 3 wherein a time to the intersection of the line segments is determined for the host vehicle.

6. The method of claim 3 wherein boundary box of the host vehicle and the boundary box of the remote vehicle are subdivided in two portions.

7. The method of claim 1 wherein assessing whether an intersection is present between the vehicle boundary of one of the host vehicle or remote vehicle and the trajectory boundary of the other of the host vehicle or remote vehicle further comprises the steps of determining a location of the potential collision between the host vehicle and the remote vehicle.

8. The method of claim 7 wherein determining the location of the potential collision between the host vehicle and the remote vehicle further comprises the steps of:
   identifying a line segment that relates to a current position of the vehicle boundary of the host vehicle or remote vehicle;
   identifying discrete time positions along the trajectory path of the other of the remote vehicle or host vehicle;
   constructing line segments between the discrete time positions in the trajectory path of the other of the remote vehicle or host vehicle;
   determining a boundary box around the trajectory path boundary of the other of the remote vehicle or host vehicle;
   subdividing the boundary box of the other of the remote vehicle or host vehicle;
   regenerating the boundary box of the other of the host vehicle or remote vehicle;
   determining whether only a single line segment that intersects the line segment of the host vehicle or remote vehicle is present in the boundary box of the other of the host vehicle or remote vehicle;
   if only the single line segment is not present in the boundary box of the other of the remote vehicle or host vehicle, then repetitively subdividing the boundary box and regenerating the boundary box until a single line segment is present for the other of the remote vehicle or host vehicle;
   identifying the location of the intersecting line segments between the host vehicle and the remote vehicle.

9. The method of claim 1 wherein the first control action includes a brake apply operation.

10. The method of claim 9 wherein the first control action includes an indicator to the driver of the vehicle to apply vehicle braking manually.

11. The method of claim 1 wherein the second control action includes at least one of a steering maneuver and a speed reduction operation.

12. The method of claim 11 wherein the second control action includes an indicator to the driver of the vehicle to apply at least one of the steering maneuver and the speed reduction operation manually.

13. The method of claim 11 wherein the second control action includes an autonomous vehicle operation for applying at least one of the steering maneuver and the speed reduction operation.

14. The method of claim 1 wherein the third control action includes at least one of a steering maneuver and a speed reduction operation.

15. The method of claim 1 wherein the third control action is a negotiated control action, wherein the host vehicle and the remote vehicle communicate for determining which of the host vehicle or remote vehicle performs at least one of a steering maneuver and a speed reduction operation.

16. The method of claim 15 wherein the third control action includes an indicator to the driver of the vehicle to apply at least one of the steering maneuver and the speed reduction operation manually.

17. The method of claim 15 wherein the third control action includes an autonomous vehicle operation for applying at least one of the steering maneuver and the speed reduction operation.

18. A collision assessment and mitigation system comprising:
   a vehicle-to-vehicle communication module for transmitting and receiving messages between a host vehicle and a remote vehicle, the messages received from the remote vehicle include a vehicle position of the remote vehicle and a trajectory path of travel of the remote vehicle;
   a threat assessment module for assessing a potential collision between the host vehicle and the remote vehicle, the threat assessment module identifying a vehicle position and a trajectory path of the host vehicle, the threat assessment module constructing a vehicle boundary around the vehicle position of the host vehicle and a trajectory path boundary around the trajectory path of the host vehicle, the threat assessment module constructing a vehicle boundary around the vehicle position of the remote vehicle and a trajectory path boundary around the trajectory path of the remote vehicle, the vehicle threat assessment module assessing a potential collision based on intersections of the respective boundaries between the host vehicle and the remote vehicle;

a vehicle control module for actuating a control action for mitigating the potential collision based on the assessment by the threat assessment module;

wherein the threat assessment module is configured to perform the method comprising the steps of:

assessing in a first priority test whether an intersection between the vehicle boundary of the host vehicle and the vehicle boundary of the remote vehicle is present, and actuating a first control action in the host vehicle only if the intersection is present between the vehicle boundary of the host vehicle and the vehicle boundary of the remote vehicle;

if an intersection is not present in the first priority test, then assessing in a second priority test whether an intersection between the respective trajectory path boundary of one of the host or remote vehicle and a respective vehicle boundary of the other of the host vehicle or remote vehicle is present, and actuating a second control action in the host vehicle only if the intersection is present between a respective vehicle boundary and a respective trajectory path boundary is present;

if an intersection is not present in the second priority test, then assessing in a third priority test whether an intersection between the trajectory path boundary of the host vehicle and the trajectory path boundary of the remote vehicle is present, and applying a third control action in at least one of the host vehicle or remote vehicle only if the intersection is present between the trajectory path boundary of the host vehicle and the trajectory path boundary of the remote vehicle.

19. The system of claim 1 further comprising an indicator for alerting the driver of one of the host vehicle or remote vehicle to apply at least one of the steering maneuver and the speed reduction operation.

20. The system of clam 1 wherein third control action is a negotiated control action, wherein the host vehicle and the remote vehicle communicate for determining which of the host vehicle or remote vehicle performs at least one of a steering maneuver and a speed reduction operation.

* * * * *